United States Patent [19]

Shirai et al.

[11] 4,079,819
[45] Mar. 21, 1978

[54] INTERNAL SHOE DRUM BRAKE ADJUSTER WITH MECHANICALLY OPERATED BRAKE

[75] Inventors: Hiroyuki Shirai, Kodaira; Atushi Fujii, Tokyo; Yoshiyuki Natori, all of Tokyo, Japan

[73] Assignee: Nissan Motor Company, Ltd., Japan

[21] Appl. No.: 731,528

[22] Filed: Oct. 12, 1976

[30] Foreign Application Priority Data

Oct. 13, 1975 Japan ................ 50-123131

[51] Int. Cl.² .............................................. F16D 51/12
[52] U.S. Cl. ............................... 188/327; 188/79.5 P; 188/106 A; 188/196 BA
[58] Field of Search .............. 188/327, 328, 329, 330, 188/325, 79.5 K, 79.5 GC, 79.5 GE, 79.5 GT, 196 B, 196 BA, 196 V, 196 F, 106 A, 79.5 P

[56] References Cited

U.S. PATENT DOCUMENTS

| 3,583,532 | 6/1971 | Hodkinson | 188/79.5 GE |
| 3,719,258 | 3/1973 | Margetts | 188/196 BA X |
| 3,722,635 | 3/1973 | Torii et al. | 188/196 BA X |

FOREIGN PATENT DOCUMENTS

| 2,246,501 | 4/1973 | Germany | 188/79.5 GE |

*Primary Examiner*—Trygve M. Blix
*Assistant Examiner*—Douglas C. Butler

[57] ABSTRACT

An improved adjuster for a shoe drum brake comprising a strut of adjustable length extending between one of the brake shoes and an arm of an operating lever that is actuated by a hand brake. The strut has a threaded part or spindle and a ratchet threadedly engaging with the threaded part. The adjuster also comprises a pawl arm carried by the arm of the operating lever and having a pawl cooperating with the ratchet. The arm of the operating lever is formed with a nose positioned for engagement with the other one of the brake shoes. The threaded part of the strut is formed with a stopper which is adapted to engage with the ratchet to define the minimum length of the strut.

3 Claims, 5 Drawing Figures

INTERNAL SHOE DRUM BRAKE ADJUSTER WITH MECHANICALLY OPERATED BRAKE

The present invention relates to internal shoe drum brakes.

In accordance with the present invention, there is provided an internal shoe drum brake comprising: first and second brake shoes having adjacent ends; shoe return spring means for biasing said first and second brake shoes toward each other; an actuator engaging one pair of said adjacent ends of the brake shoes; mechanically operated brake having an operating lever having an arm carrying a supporting pin, said arm of said operating lever being positioned for operative engagement with said first brake shoe; an adjustable length strut having a tubular part having one end in operative engagement with said second brake shoe and other end and a threaded part pivotally mounted on the supporting pin and received in the tubular part; a pawl arm pivotally mounted on the supporting pin and carrying a pawl; a ratchet wheel rotatably mounted on the strut on the threaded part and engaged by the pawl for effecting adjustment of the strut length; and biasing means for biasing the pawl into engagement with the ratchet wheel and for biasing the pawl arm in one rotational direction about the supporting pin toward a predetermined angular position relative to the supporting pin, the adjustable strut comprising a stopper formed on the threaded part to limit movement of the ratchet wheel to define the minimum strut length.

One form of vehicle wheel internal shoe drum brake in accordance with the present invention will now be described, by way of example, with reference to the accompanying drawings, in which.

Figure 1:
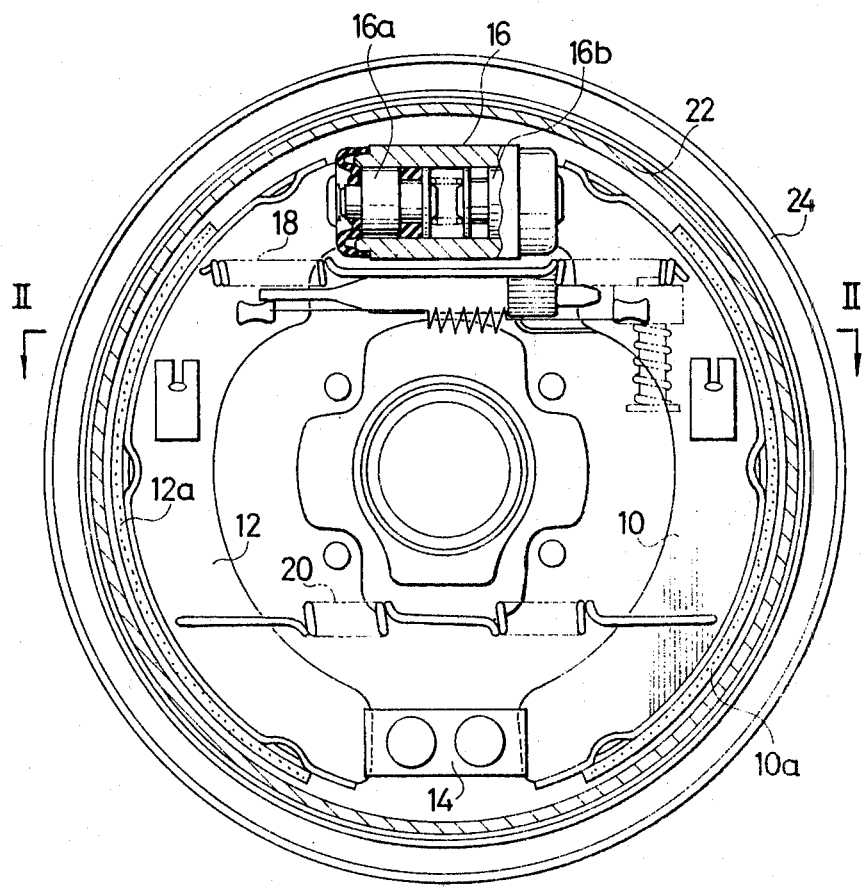
FIG. 1 is a side view of one form of brake.

An internal shoe drum brake shown in FIG. 1 comprises a pair of opposed arcuate brake shoes 10 and 12 having one pair of adjacent ends engaging an abutment 14 and the other pair engaging an actuator 16 for service brake operation. Two shoe return springs 18 and 20 bias the shoes 10 and 12 toward each other and away from a brake drum 22. Numeral 24 indicates a back plate on which the abutment 14 and the actuator 16 are mounted. Reference numerals 10a and 12a indicate shoe linings adhered to the brake shoes 10 and 12, respectively.

Figure 2:
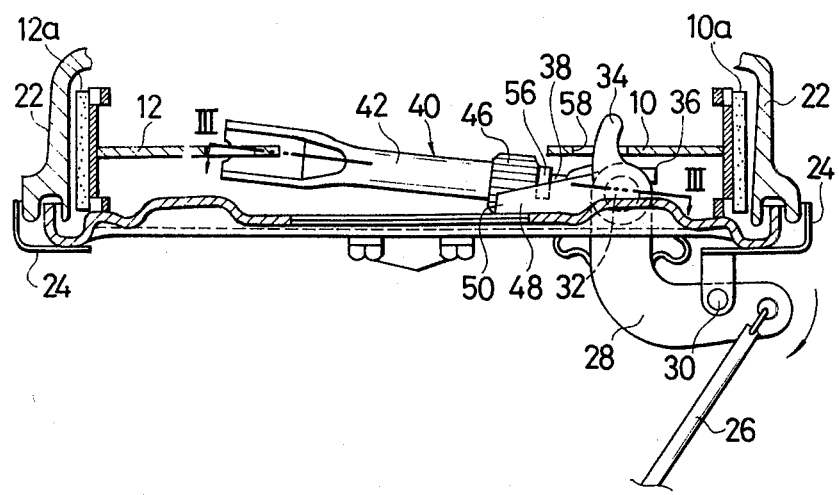
FIG. 2 is a section taken along the line II—II of FIG. 1.
Figure 3:
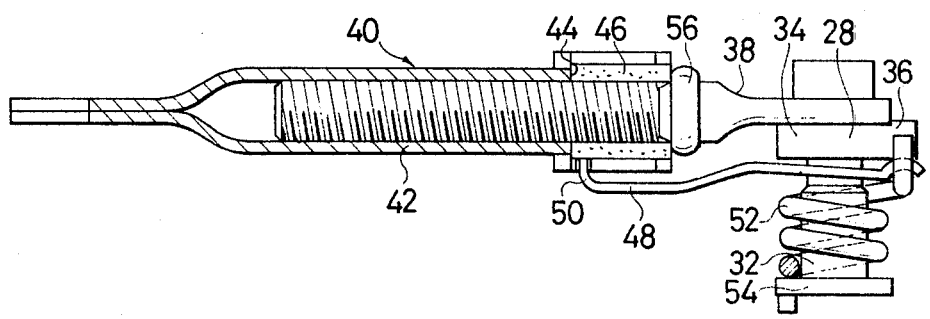
FIG. 3 is a section taken along the line III—III of FIG. 2.

As can be seen in FIGS. 2 and 3, a hand brake cable 26 is connected to one arm of an operating lever 28 The other arm of the operating lever 28 carries or has fixedly mounted thereto a transverse supporting pin 32 and it has a nose 34 positioned for operative engagement with the brake shoe 10 and a shoulder 36. A threaded part 38 of an adjustable strut 40 is pivotally mounted on the supporting pin 32 and received in a tubular part 42 of the adjustable strut 40. The tubular part 42 has one end in operative engagement with the brake shoe 12 and other end 44 through which the threaded part 38 extends into the tubular part 42. Rotatably mounted on the threaded part is a nut 46 having a ratchet teeth around its circumference, rotation of the nut 46 varying the length of the strut 40. The threaded part 38 of the strut 40 engages a pawl arm 48 which is mounted on the supporting pin 32. The pawl arm has a pawl 50 at one one end thereof cooperating with the ratchet teeth. As best seen in FIG. 3, the pawl arm 48 is biased upwardly as viewed in this figure toward the operating lever 28 by means of a coil compression spring 52 acting between a flange 54 at one end of the supporting pin 32 and the pawl arm 48 so that the pawl 50 is yieldably held in engagement with the ratchet teeth of the nut 46. The coil compression spring 52 is mounted around the supporting pin 32 one end of which is anchored to the flange 54 and the other end of which rests on the other end of the pawl arm 48 and the shoulder 36 of the operating lever 28 so as to bias the pawl arm 48 in clockwise direction, as viewed in FIG. 2 about the supporting pin 32 toward a predetermined angular position, as illustrated in FIG. 2, relative to the supporting pin 32.

Figure 4:
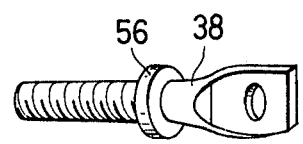
FIG. 4 is a side view of one form a threaded part of an adjustable length strut employed in the brake.
Figure 5:
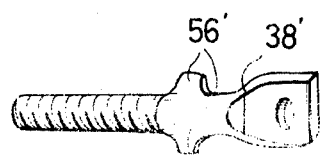
FIG. 5 is a side view of a modified form of a threaded part of an adjustable length strut employed in the brake.

As can be seen in FIGS. 2 through 4, the threaded part 38 is formed with a stop 56 which limits movement of the ratchet wheel 46 to define the minimum strut length. The stop 56 takes the form of a flange or it may take the form of two diverging projections 56' as shown in FIG. 5. The threaded part shown in FIG. 5 is substantially the same as the threaded part 38 and is indicated at 38'.

When mounting an assembly comprising two brake shoes 10, 12 having one pair of adjacent ends engaging the abutment 14 and the other pair engaging the actuator 16, two shoe return springs 18, 20 biasing the two brake shoes toward each other and the adjustable strut 40 within the drum 22, turn the nut 46 until it abuts on the stop 46 to let the strut 40 take the minimum length thereby setting the maximum diametral distance between the two brake shoes 10 and 12 at such length that when the assembly is mounted within the drum 22 a clearance between each of the shoe linings on the brake shoes 10, 12 and the drum 22 exceeds an appropriate amount by 2 to 3 mm. When the assembly is under this condition, two opposed pistons 16a, 16b of the actuator 16 have their inward ends spaced from each other to apply the biasing force due to the two return springs 18, 20 across the tubular part 42 and the threaded part 38 to let the nut 46 to engage the annular end 44 of the tubular part 42.

After mounting the assembly within the drum 22, an initial adjustment of the clearance can be effected by operating the handbrake. In the operation of the handbrake, the operating lever 28 is rotated clockwise, as viewed in FIG. 2, this movement, via the strut 40 urges the brake shoes 10 and 12 against the bias of the springs 18 and 20 toward the drum 22 and the pawl arm 48 rotates clockwise about the shaft 32 under the action of the spring 52. The nut 46 can be rotated by the pawl 50 to adjust the length of the strut 40 until the clearance reduces to the appropriate amount. Upon release of the handbrake the brake shoes are pulled towards each other by the return springs 18. As the nut 46 firmly engages the annular end 44 of the tubular part under the action of the springs 18, 20 upon release of the handbrake, the resistance to rotation of the nut 46 is great enough, so that the pawl arm 48 cannot rotate the nut 46 in the opposite direction and can pick up a fresh ratchet tooth.

It will be seen that upon operation of the handbrake the nut 46 can be rotated by the pawl 50 to adjust the length of the strut if the wear of the brake is sufficient and the pawl arm 48 picks up a fresh ratchet tooth.

In operation of the service brake, the actuator 16 forces the brake shoes 10 and 12 apart against the bias of the shoe return springs 18, 20. Upon release of the actuator 16 the brake shoes are pulled towards each other by the return springs 18, 20. It will be seen that the nose 34 of the operating lever 28 is disposed in a slot 58 formed in the web portion of the brake shoe 10 and the slot 34 is sized to provide a lost motion connection between the operating lever 28 and the brake shoe 10 when the actuator 16 forces the brake shoes 10, 12 apart from each other and the brake shoes are pulled toward each other upon release of the actuator 16.

It will be recognized from the receding description that since the initial adjustment of clearance can be effected by operating the handbrake, the brake according to the present invention is easy to assemble.

What is claimed is:

1. An internal shoe drum brake comprising:

first and second brake shoes having adjacent ends;

shoe return spring means for biasing said first and second brake shoes toward each other;

an actuator engaging one pair of said adjacent ends of said brake shoes;

mechanically operated brake having an operating lever having an arm carrying a supporting pin, said arm of said operating lever being positioned for operative engagement with said first brake shoe;

an adjustable length strut having a tubular part having one end in operative engagement with said brake shoe and a threaded part pivotally mounted on said supporting pin and received in said tubular part;

A pawl arm pivotally mounted on said supporting pin and carrying a pawl;

a ratchet wheel rotatably mounted on said strut on said threaded part and engaged by said pawl for effecting adjustment of the strut length; and means for biasing said pawl into engagement with said ratchet wheel and for biasing said pawl arm in one rotational direction about said supporting pin toward a predetermined angular position relative to said supporting pin;

said adjustable strut comprising a stopper formed on said threaded part to limit movement of said ratchet wheel to define the minimum strut length;

said biasing means comprising a compression coil spring mounted around said supporting pin and having one end anchored to a flange secured to one end of said supporting pin and other end engaging said pawl arm and a shoulder formed on said arm of said operating lever.

2. An internal shoe drum brake as claimed in claim 1, in which said stopper takes the form of a flange.

3. An internal shoe drum brake as claimed in claim 1, in which said stopper takes the form of two diverging projections from said threaded part.

* * * * *